United States Patent [19]

Pause et al.

[11] 3,730,343
[45] May 1, 1973

[54] METHOD AND APPARATUS FOR SEPARATING WATER FROM A MIXTURE OF A GRANULAR MATERIAL AND WATER

[75] Inventors: Kurt Pause; Heinrich Buzga, both of Grevenbroich, Germany

[73] Assignee: Maschinenfabrik Buackau R. Wolf AG, Munich, Germany

[22] Filed: Mar. 2, 1971

[21] Appl. No.: 120,174

[30] Foreign Application Priority Data

Mar. 4, 1970 Germany.....................P 20 10 128.4

[52] U.S. Cl.......................210/68, 210/78, 210/378, 210/381
[51] Int. Cl..............................................B01d 33/02
[58] Field of Search........................210/78, 369, 378, 210/380, 381, 376, 360, 68

[56] References Cited

UNITED STATES PATENTS

| | | | |
|---|---|---|---|
| 2,312,829 | 3/1943 | Bird et al. | 210/78 |
| 3,477,098 | 11/1969 | Swickard et al. | 210/78 |
| 2,100,118 | 11/1937 | Andrews | 210/380 X |
| 3,552,575 | 1/1971 | Hultsch | 210/369 |
| 3,483,987 | 12/1969 | Hilsinger | 210/380 X |
| 3,062,626 | 11/1962 | Beck | 210/381 X |
| 2,870,913 | 1/1959 | Heckmann | 210/376 X |
| 3,216,577 | 11/1965 | Garrone | 210/380 X |
| 3,553,014 | 1/1971 | Bange | 210/78 |
| 3,290,172 | 12/1966 | Dietzel et al | 210/369 X |

*Primary Examiner*—Samih N. Zaharna
*Assistant Examiner*—F. F. Calvetti
*Attorney*—Michael S. Striker

[57] ABSTRACT

Water is separated from a mixture of a granular material with water by first separating by a screen all water which is not retained by the granular material, and flows through the screen by the action of gravity. At the same time, the granular material and the retained water is supplied to zigzag-shaped radial channels of a centrifuge where slanted screens separate retained water from the granular material. Water still adhering to the granular material is evaporated by streams of air blowing into the outer end of the zigzag-shaped channels, and into a discharge duct for transporting the granular material to an outlet while evaporating still adhering water.

22 Claims, 4 Drawing Figures

METHOD AND APPARATUS FOR SEPARATING WATER FROM A MIXTURE OF A GRANULAR MATERIAL AND WATER

BACKGROUND OF THE INVENTION

The present invention concerns a method for separating water from granular material in a mixture in which the ratio between granular material and water is at least 1 : 50 by weight. The method is particularly applied to synthetic spinning fiber granules, which have stored a substantial amount of heat, and have a substantial temperature differential between the center of the granules and the outer surface of the same, while the temperature on the outer surface permits only a negligible amount of water per time unit to be diffused into and absorbed by the granules.

Granules consisting of certain synthetic plastic materials absorb in the temperature range around 100° C, water within fractions of a second. Such synthetic plastic material is, for example, polyamide, polyester, and polyvinylchloride. The absorbed water detrimentally affects the further treatment of the synthetic granules, and must be removed by thermal drying apparatus in accordance with the prior art.

This procedure is very time-consuming and expensive. In order to eliminate the detrimental influence of oxygen, the method according to the prior are requires drying in the presence of a protective gas. A certain wear of the granular material cannot be avoided during the drying operation, since the same takes longer than 30 hours, and requires a constant movement of the granular material.

Known methods for separating water from a granular material, which use screens, particularly swinging screens, require a time of between 5 to 20 seconds before the removal of water retained by the granular material can be started, after the freely flowing, not retained, water has been removed. Since the centers of the granules have still a temperature of 100° C, the adhering water film is quickly heated, and the surfaces of the granules, which were already cooled to 40° to 60° C, are again heated to a temperature above 80° C. At such a temperature, and at higher temperature, the water absorption takes place 100 times faster than at the lower temperature. In the known method for separating water from a granular material, the diffusing of water into the granules cannot be avoided. If still large quantities of free flowing water are present, the danger of absorption of water into the granular material is not present, because the large amount of water holds the temperature of the surfaces of the granules at a low level.

SUMMARY OF THE INVENTION

It is one object of the invention to avoid that water can be diffused into and absorbed by granular material after water, which is not retained by the granular material, has been removed.

Another object of the invention is to provide a method for totally removing water from a granular material.

Another object of the invention is to provide a centrifuge for removing all the water from a mixture of granular material and water by means of successive steps.

Another object of the invention is to remove all the water from a mixture of a granular material with water, by first passing non-retained water through a screen by the action of gravity, then removing retained water almost completely by the action of the centrifugal force, and finally removing small quantities of water adhering the granular material by evaporating the water films adhering to the granular material.

With these objects in view, a preferred method for separating water from a mixture of a granular material and water comprises the following steps in direct succession:

a. applying low forces, such as gravitational forces, to the masses of the mixture for separating from the granular material 97 to 98 percent of the water which is free flowing and not retained by the granular material;

b. applying great forces, such as centrifugal forces, to the masses of the mixture for separating from the granular material 1.5 to 2.8 percent of the water which is filler water in the granular material; and c. evaporating 0.5 to 0.2 percent of the water which adheres to the granular material as a film, preferably using a stream of air transporting the granular material to an outlet of the centrifuge in which part of the retained water is removed.

In accordance with the method of the invention, the steps of the method are carried out in direct succession, and no time passes between removal of the free flowing water, the removal of the filler water, and the evaporation of the still adhering water. Due to this arrangement, the cooling effect, and thereby the prevention of a rise of the temperature of the granular material, and the increased heat absorption of the non-retained water, are replaced by the cooling and drying stream of gas.

A screen or sieve is advantageous for separating most of the water which is not retained by the granular material. In order to remove the non-retained water quickly, high speed of the water flowing through the screen or sieve is required. However, in order to cause great forces to act on the masses of the mixture, as required for removal of the water filling the spaces between the granules of the material, the mixture of granular material and retained water must be greatly accelerated and decelerated.

To remove the last water adhering the granules by absorption, a high relative speed between the stream of gas, such as air, and a granular material is necessary.

The required steps of the method can be advantageously carried out by the centrifuge of the invention. Known centrifuges require, due to the great amount of nonretained free flowing water, a preceding separate removal of this water. The disadvantage is that the water retained by the granular material after removing of the free flowing water, is absorbed by the granular material. In order to overcome this undesired event, the present invention provides a centrifuge which has a rotor with two parallel horizontal discs, and guiding and screening means secured to the discs, and including baffle plates, screens, and guide plates to form separate non-communicating substantially zigzag-shaped channels extending in radial direction.

The energy required for accelerating the nonretained free flowing amount of water of the mixture must be kept within economically acceptable limits, and the main part of the water is preferably not accelerated by centrifugal action.

For the acceleration of a rotating mass, the mass inertia is an important factor. The mass inertia varies with the square of the radius. While the granular material must be subjected to great centrifugal forces to remove adhering retained water, the main part of the free water is to be removed at small mass forces, in other words, most of the water of the mixture will have to pass through the centrifuge without being substantially accelerated which would require substantial energy.

In accordance with the invention, the guiding and screening means form zigzag-shaped radially extending channels including several screens. The screens of all channels are disposed along a plurality of radially spaced circles concentric with the axis of the centrifuge, and the screens are parallel to the axis and slanted a predetermined angle to the tangential direction of the respective circle in a direction opposite to the direction of the rotor.

When a screen is arranged in radial direction, the screen plane forms with a tangent at the respective radius, an angle of 90°. The circumferential acceleration acts in the direction of the tangent, and is associated with the increase of the radius within a time unit. However, if the plane of the screen forms an angle with the radius in the direction of rotation, the angle with the tangent is reduced by the respective angle. In an extreme case, the angle between the plane of the screen and the tangent would become zero. In this event, a granule on the screen would not be accelerated in circumferential direction, but would rest on the screen, and would be subjected only to a centripetal acceleration, and to corresponding forces acting on the masses.

Since the granular material is subjected to friction, it is advantageous to select the tangent of the angle, at which the screens are slanted to the tangent, to be equal to the friction of the granular material on the screens. If the screens are so arranged and constructed a component of the centripetal acceleration acts on the granular material, in addition to a component of the circumferential acceleration, reduced by the friction of the granular material due to the movement along a screen. Thereby, the component of the centripedal acceleration has a greater effect on the granular material. If the angle between the slanted screen and the tangent on the respective circle is held constant, the surface of the screen would have to follow the curvature of a loxodrome, and the above-mentioned accelerations and mass forces would remain constant.

In accordance with the invention, baffle plates are associated with each screen, and located on the respective other side of the respective zigzag channel. The baffle plates are transverse to the respective preceding screens. Thereby, the radial speed of the granular material is eliminated by the impact on the baffle plate, while the tangential speed is retained. The baffle plates are slightly slanted in the direction of rotation with respect to the associated tangent, so that the impinging granular material is slightly accelerated in the direction opposite to the direction of rotation, and thereby again impinges the next following screen. During this impact, the granular material is again subjected to an increased centrifugal force, and to a new acceleration in radial direction.

It is advantageous to construct the baffle plate which is closest to the center of the rotor, and to the inner ends of the zigzag-shaped channels, also as a screen, in which event water which impinged impermeable parts of the innermost screen, passes the baffle plate screen due to its radial speed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
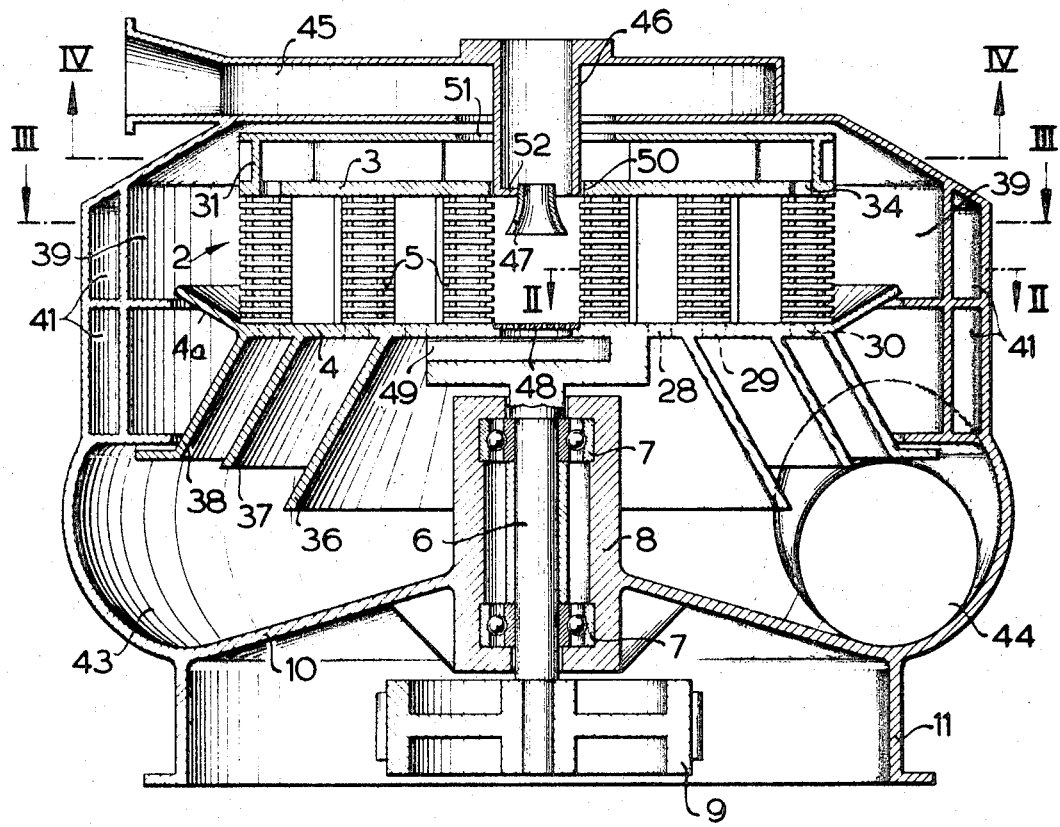
FIG. 1 is an axial sectional view of a preferred embodiment of the invention, taken on line E — F in FIG. 2.

A centrifuge has a stationary casing 1, and a rotor 2 which includes an upper planar circular disc 3, a lower planar circular disc 4, and guiding and screening means 5 between the two discs, secured to the same. The rotor 2 is mounted on a vertical drive shaft 6 which is supported in bearings 7 mounted in a housing 8 secured to the bottom 10 of casing 1. A drive pulley 9 is secured to drive shaft 6 for driving rotor 2.

Figure 2:
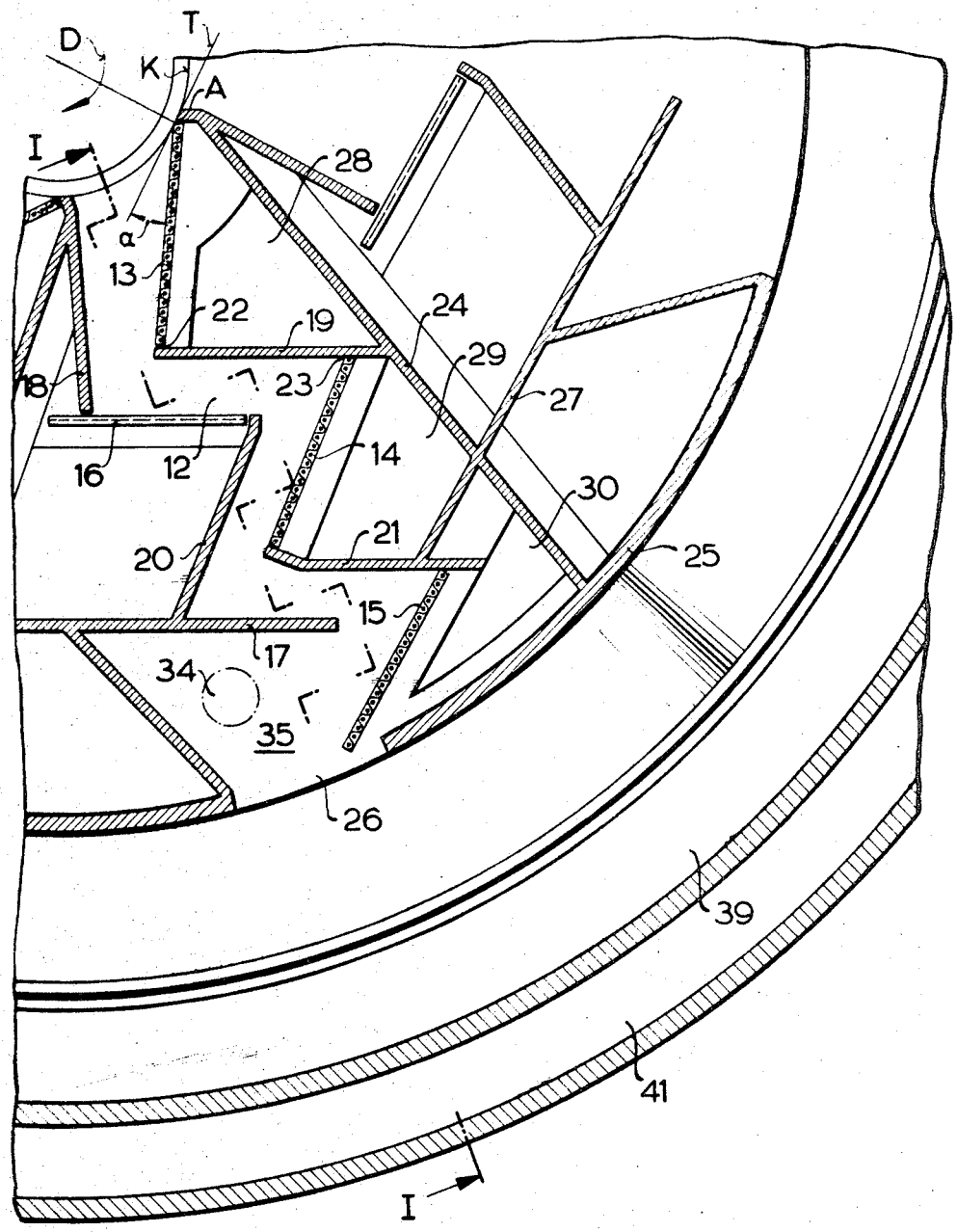
FIG. 2 is a horizontal sectional view taken along line A —B in FIG. 1, and being drawn to an enlarged scale.

The guiding and screening means 5 form a plurality of substantially radial zigzag-shaped channels 12, best seen in FIG. 2. The zigzag-shaped channels 12, on of which is particularly shown in FIG. 2, include screens 13 to 15, buffer plates 16 and 17, and guide plates 18 to 21. Screens 13, 14 and 15 alternate with guide plates 19 and 21 to form one side of a channel 12, while the baffle plates 16 and 17 alternate with guide plates 18 and 20 to form the other boundary of channel 12.

The screens 13 to 15 of all channels 12 are respectively circumferentially aligned along circles of different diameter. Each of the screens 13 to 15 is parallel to the axis of rotation defined by bearings 7 and drive shaft 6, but the screens are slanted in horizontal planes to the tangent of the respective circle K where the inner end of the respective screen 13 is located. The angular slant of the screens 14 and 15 corresponds to the tangent of the respective circles associated with all screens 14 and 15, respectively. The angle $\alpha$ is located in the direction opposite to the direction of rotation D of rotor 2. Screens 13, 14 and 15, and guide plates 19 and 21 form a zigzag-shaped wall due to the fact that the inner end of guide plate 19, for example, abuts the outer end of the inner screen 13 at the point 22, and the outer end of guide plate 19 abuts the inner end of screen 14 at the point 23.

In accordance with the invention, separate flows of water are maintained in the zigzag-shaped channels 12. In order to prevent water in one of the channels 12 to enter the next adjacent channel, radial partitioning walls 24, to which the guide plates 19 and 21, for example, are secured, are located trailing in the direction of rotation D behind the screens 13, 14 and 15. The partitioning walls 24 are almost straight, and radial, and are secured to peripheral curved wall portions 25 which form discharge openings 26 for each zigzag-shaped channel 12. Supporting walls 27 are also provided which space the upper and lower discs 3 and 4 from each other, and reinforce the structure of the rotor.

Water passing through screens 13, 14 and 15 which move with the rotor in the direction D, enter the spaces between partitioning wall 24 and the guide plates 19, 21, where outlets 28, 29 and 30 are provided in the lower disc 4 so that the water separated from the granular material flows downward through outlets 28, 29, 30 and is further guided by frusto-conical guide walls 36, 37, 38, best seen in FIG. 1, to guide the water outward and downward toward a low portion 43 of casing 1 along which the water can flow out of the casing through an outlet tube 44. The lower circular edges of the frustoconical guide walls 36, 37, 38 are positioned at different heights so that the discharged water flows without turbulence in several streams which do not interfere with each other.

Figure 4:
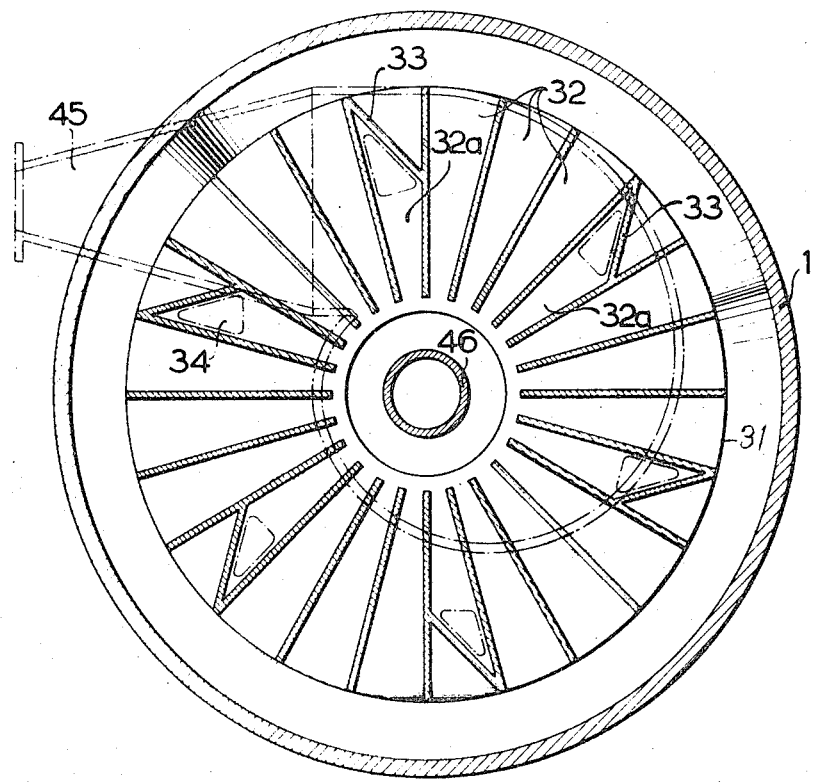
FIG. 4 is a horizontal sectional view taken on lines G — H in FIG. 1.

Above the upper disc 3, a blower means 31 is supported, in which several radially extending sector-shaped channels 32 are provided, as best seen in FIG. 4. Some of the channels 32 are closed by closure walls 33 at the outer ends, and form closed compartments 32a, which are connected through openings 34 in the upper disc 3 with the outer ends 35 of the zigzag-shaped channels 12, respectively, directly communicating with the discharge openings 26.

Figure 3:
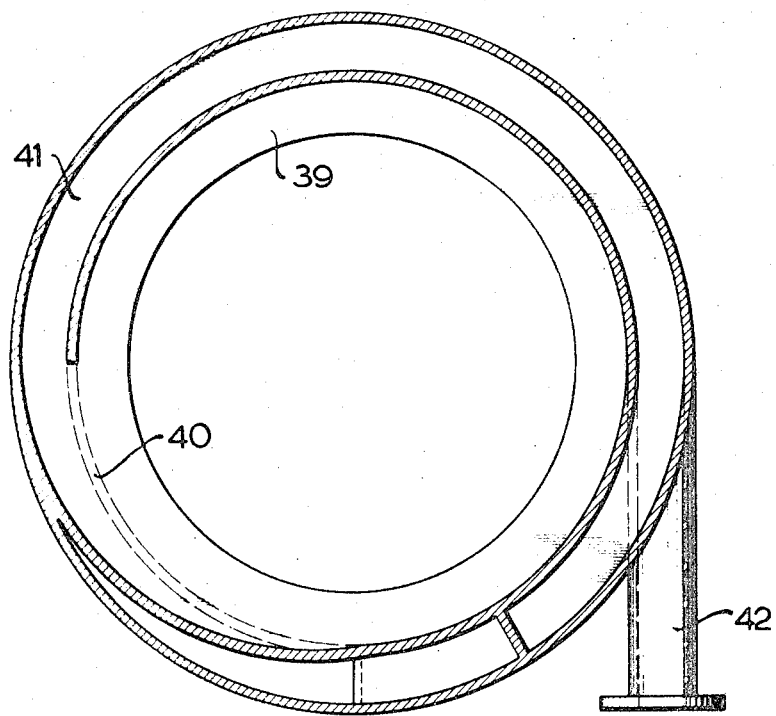
FIG. 3 is a horizontal sectional view taken on line C — D in FIG. 1.

Gas or air sucked through inlet 45 in casing 1, flows through an opening 51 into the blower wheel 31, and is guided through the open sector-shaped channels 32 into an annular discharge channel 39 provided in the casing 1. This gas, which moves faster than the granular material, entrains the granular material discharged through outlet openings 26, see FIG. 2, passing along the annular portion 4a projecting from the lower disc 4. The granular material is transported through a tangential outlet 40 into another discharge channel 41 surrounding discharge channel 39 being preferably spiral-shaped so that two turns are provided axially adjacent each other, the lower portion of the outer discharge conduit 41 ending in a discharge flange 42 extending in tangential direction, as best seen in FIG. 3.

While transported by a stream of fresh gas in the discharge channels 39, 41, the granular material is located in a stream of faster moving gas, and is cooled while any water adhering the granules is evaporated. The cooling effect is improved due to the fact that the discharge channel 41 has at least two turns, so that the distance along which the stream of gas can act on the granular material is extended.

Part of the gas transported by blower 31, flows through the closed compartment 32a and openings 34 into the screen chambers 35, as explained above. Due to the high speed at which screen 15 rotates, the gas entering the region 35 passes through screen 15, evaporating adhering water from the granular material in the respective zigzag channel 12, and being impinged by screen 15, so that the adhering water is separated from the granular material by evaporation. At the same time the surface temperature of the granular material is further reduced due to convection and removal of evaporation heat.

The upper disc 3 has a central opening 50 into which a filling pipe 46, secured to casing 1, projects. The filling pipe 46 receives the mixture of granular material with water so that the mixture freely falls into the central opening 50 and the corresponding central portion of the rotor between discs 3 and 4 and at the inner ends of the guiding and screening means 5.

The lower disc 4 also has a central opening which is closed by an outlet screen 48. A discharge channel 49 is provided below the outlet screen 48, in a rotor portion below disc 4, and water discharged from channel 49 is guided by a frusto-conical guide structure 36 toward the lower portion 43 of casing 1 to be discharged through the tangential outlet means 44.

A very great part of the free water of the mixture passes through screen 48, without requiring centrifugal action due to rotation. Consequently, the free flowing water charged into the filling tube 46 and passing through outlet screen 48, requires no energy from the drive means of the centrifuge to be separated from the granular material.

For certain granular materials, it is advantageous to use instead of the rotating outlet screen 48, a stationary conically shaped screen whose point is placed on top, opposite to the direction in which the mixture enters the rotor. The greater opening of such an outlet screen is sufficiently large to cover the central discharge opening in the lower disc 4, while the upper reduced end can be secured to the filler pipe. Such an enlarged stationary conical outlet screen prevents an acceleration of the free flowing water which is discharged through the outlet screen before accelerated by the rotation of rotor 2.

In order to avoid that only the lower parts of the guiding and screening means 5 are supplied with the mixture in the event that the rotor between discs 3 and 4 is rather high, it is advantageous to mount a flaring tubular guiding member 47 on spokes 52 at the lower end of filling pipe 46. The flaring guide member 47 may have a parabolic curvature, and also may consist of several elements to distribute the entering mixture to the upper and lower parts of the guiding and screening means 5.

The mixture of granular material and water entering through the filling pipe 46 without any circumferential speed, at the center of the rotor, it is impinged by screens 13, and then by the other screens 14 and 15, at a great relative speed, since the screens 13 to 15 circumferentially move at high speeds, while the entering mixture has no circumferential speed. The friction acceleration is small due to the low viscosity of water, and the short radial distances. If the free area of the screens 13 to 15 is large enough, the entering water will be passed by the screens 13, 14 and 15 while at a standstill relative to the same in circumferential direction, and without being substantially accelerated.

As viewed from a stationary point, the water flows radially apart when impinging a rotating planar surface. While the planar surface rotates, and the plane in which the water flows is stationary, the screen surfaces beat against the water and pass through it, while the water, which does not substantially move in circumferential direction, passes through the openings of the screen, so that the water can be discharged at a small radius.

The comparatively large granules are retained by the screens, and are deposited on the leading surfaces of screens 13, 14 and 15 while the screens move in circumferential direction so that the deposits move with the screens, which requires acceleration of the granular material to the circumferential speed of the screens 13, 14, 15.

Since the first impinging of the mixture by the screens 15 takes place in the free flowing water of the mixture, this impingement cannot completely drain the water from the granular material, and the following circumferential acceleration is insufficient for removing all the remaining water from the granular material.

Since during rapid acceleration of the granular material, very great mass forces occur, the rapid circumferential acceleration must take place repeatedly, particularly after the free flowing water of the mixture has been removed. The retained dripping filler water, and the water film adhering to the granules, must be removed by rapid and repeated accelerations in circumferential direction.

For this reason, several screens 13, 14 and 15 spaced in radial direction are provided for each zigzag channel and form a zigzag path. Since the screens are positioned so that the screening plane is located in a tangent to the respective circle, or slightly slanted to the tangent in a direction opposite to the direction of rotation, the radial speed of the granular material is destroyed, so that great decelerations at great mass forces take place, while the tangential speed is subatantially maintained. Due to the slightly negative inclination of the slanted screen, a granular material, radially braked on the same, slides on the screen opposite to the direction of rotation, and is then guided by baffle plates 16 and 17 to impinge a following screen which has the same or substantially the same inclination to the tangent and to the radius as the first screen 13. The impinged granular material is again accelerated in tangential direction by screen 14, and in radial direction inward depending on the angle defined by the screen with the tangent on the respective circle. Water retained by the surface of the granular material is separated due to the developing forces acting on the masses of the granular material and water, until an equilibrium with the adhesive forces is obtained.

The still adhering water film is removed by evaporation in the discharge channels 39, 41 while transported by the stream of air produced by blower 31.

It will be understood that each of the elements described above, or two or more together, may also find a useful application in other types of a method for separating water from a mixture of a granular material and water differing from the types described above.

While the invention has been illustrated and described as embodied in a centrifuge for separating water from a mixture of a granular material with water, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A centrifuge for separating water from a mixture of a granular material and water, comprising a supporting casing having a central inlet means on top, first outlet means for the material, and second outlet means for water; a rotor mounted in said casing for rotation about a vertical axis, said casing including top and bottom walls, and a plurality of radial guiding and screening means secured to said top and bottom walls and forming between the same angularly spaced radial, vertical zigzag-shaped channels having inner open ends communicating with said inlet means for receiving said mixture, and angularly spaced outer ends communicating with said first outlet means for the material, each guiding and screening means including screen means movable along a horizontal circular path and being disposed transversely to said path; and drive means for rotating said rotor in one direction so hat the mixture flows outward in said zigzag-shaped channels and is transversely impinged by said screen means whereby the material flows outward along the leading surfaces of said screen means out of said zigzag channels and through said first outlet means while the water of the mixture passes through said screen means and is discharged from the trailing surfaces of said screen means out of said second outlet means.

2. A centrifuge as claimed in claim 1 wherein said rotor includes radial partitioning walls between said top and bottom walls for separating said guiding and screening means and zigzag channels from each other, said guiding and screening means forming with said partitioning walls discharge channels communicating with said second outlet means so that water contained in the mixture impinged by said screen means passes through said screen means and from the the trailing surfaces thereof into said discharge channels and is discharged through said second outlet means.

3. A centrifuge as claimed in claim 2 wherein said bottom wall has in said discharge channels vertical discharge openings connected with said second outlet means.

4. A centrifuge for separating water from a mixture of a granular material and water, comprising a supporting casing having an inlet means for the mixture, a first outlet means for the material, and a second outlet means for the water; a rotor mounted in said casing for rotation about a vertical axis and including two horizontal discs, and guiding and screening means secured to said discs and forming between the same separate non-communicating substantially zigzag-shaped channels extending in substantially radial directions, and having inner ends communicating with said inlet means and outer ends communicating with said first outlet means, said guiding and screening means including a plurality of radially spaced screens bounding each channel, the screens of all said channels being disposed along a plurality of radially spaced circles concentric with said axis; and wherein said screens are parallel to said axis and slanted a predetermined angle to the tangential direction of the respective circle in a direction opposite to the direction of rotation of said rotor; and drive means for rotating said rotor in one direction so that said screens transversely impinge the mixture in said zigzag-shaped channels and the material flows along the leading surfaces of said screens and out of said first outlet means, while the water of the mixture is discharged from the trailing surfaces of said screens and out of said second outlet means.

5. A centrifuge as claimed in claim 4 wherein the tangent of said predetermined angle is at least equal to the friction coefficient of said granular material.

6. A centrifuge as claimed in claim 4 wherein said guiding and screening means include a plurality of baffle plates for each zigzag-shaped channel located in the respective channel opposite said screens, respectively, extending transversely to the next radially inward screen to guide granular material separated by said next radially inward screen toward the next radially outward screen.

7. A centrifuge as claimed in claim 6 wherein the radially innermost baffle plate in each zigzag-shaped channel is a screen plate.

8. A centrifuge as claimed in claim 6 wherein said guiding and screening means include impermeable guide plates located between said screens of each channel and connecting the outer ends of the radially inward adjacent screens with the inner ends of the radially outer adjacent screens to form one lateral zigzag wall bounding each zigzag-shaped channel on one side, and other impermeable guide plates connecting the outer and inner ends of said baffle plates and forming the other lateral zigzag wall bounding each zigzag channel on the other side thereof.

9. A centrifuge as claimed in claim 8 including impermeable partitioning walls fixed between said discs and separating said channels in circumferential direction from each other, respectively, said partitioning walls being located to trail said screens of each channel, respectively, during rotation in said one direction.

10. A centrifuge as claimed in claim 9 wherein the lower disc of said discs has radially spaced outlets between said screens of each channel and said trailing partitioning wall for discharging water separated by said screens from said granular material into said second outlet means.

11. A centrifuge as claimed in claim 10 wherein said rotor comprises radially spaced frusto-conical guide walls secured to said lower disc and downward and outward projecting from the same for guiding water discharged through said outlets, respectively, outward and downward toward a low portion of said casing into said second outlet means.

12. A centrifuge as claimed in claim 4 wherein said casing forms a discharge channel means surrounding said rotor; wherein said zigzag channels have discharge openings at the radially outer ends thereof for discharging granular material into said discharge channel means; wherein said discharge channel means has a tangential outlet; and wherein said rotor includes blower means communicating with said discharge channel means for blowing a stream of air into the same for transporting the granular material in the same toward said tangential outlet while cooling said granular material and evaporating water adhering the same.

13. A centrifuge as claimed in claim 12 wherein said casing forms another discharge channel means having a tangential first outlet means and surrounding said discharge channel means, wherein said tangential outlet opens into said other discharge channel means so that the stream of air transports said granular material in both discharge channel means until discharged through said first outlet means.

14. A centrifuge as claimed in claim 13 wherein said other discharge channel means forms a spiral-shaped discharge channel ending in said first outlet means.

15. A centrifuge as claimed in claim 14 wherein said other discharge channel means forms at least two axially adjacent turns of said spiral-shaped discharge channel.

16. A centrifuge as claimed in claim 4 wherein said rotor includes a blower wheel secured to the upper disc of said discs and having a plurality of radial walls forming sector-shaped compartments, some of said compartments having closed outer ends; wherein said upper disc has a plurality of circumferentially spaced openings communicating with said closed compartments, respectively, and with the outer ends of said zigzag-shaped channels for guiding air into the latter and through said screens for evaporating water adhering to the granular material on said screens.

17. A centrifuge as claimed in claim 16 wherein said casing forms a discharge channel means surrounding said rotor; wherein said zigzag channels have discharge openings at the radially outer ends thereof for discharging granular material into said discharge channel means; and wherein said discharge channel means has a tangential outlet; and wherein other sector-shaped compartments have open outer ends communicating with said discharge channel means for blowing a stream of air into the same for transporting the granular material toward said tangential outlet while cooling said granular material and evaporating water from the same.

18. A centrifuge as claimed in claim 4 wherein the upper disc of said discs has a central opening; and comprising a filling tube mounted on said casing and having a lower end located in said central opening for supplying said mixture to the inner ends of said zigzag-shaped channels of said rotor.

19. A centrifuge as claimed in claim 12 comprising a tubular outward and downward flaring guide member secured to said filling tube and projecting downward through said central opening toward the radially inner ends of said guiding and screening means.

20. A centrifuge as claimed in claim 4 wherein the lower disc of said discs has a central outlet opening and includes an outlet screen in said central outlet opening, and wherein the upper disc has under said inlet means a central inlet opening for the mixture above said outlet opening and communicating with the inner ends of said zigzag channels so that water not retained by said granular material freely flows through said outlet screen due to the force of gravity, while the granular material and water retained by said granular material enters said channels whereby the centrifugal force effects separation of at least part of the retained water at said screens.

21. A centrifuge as claimed in claim 20 wherein said outlet screen is conical and flares downward and outward; and said inlet means comprising a filling tube mounted on said casing and supporting said outlet screen; and wherein the upper disc of said discs has a central inlet opening in which said filling tube is located.

22. A centrifuge as claimed in claim 21 wherein the wider end of said conical outlet screen is located in said central outlet opening.

* * * * *